April 5, 1966 A. F. HILDEBRANDT ET AL 3,244,943
CONTINUOUS MAGNETIC-FLUX PUMP
Filed Nov. 29, 1961

ALVIN F. HILDEBRANDT
DANIEL D. ELLEMAN
FRANK C. WHITMORE
RANDALL A. SIMPKINS
INVENTORS

BY Lyon & Lyon
ATTORNEYS 3,244,943
CONTINUOUS MAGNETIC-FLUX PUMP
Alvin F. Hildebrandt, La Crescenta, Daniel D. Elleman, La Canada, Frank C. Whitmore, Altadena, and Randall A. Simpkins, Pasadena, Calif., assignors to California Institute Research Foundation, Pasadena, Calif., a corporation of California
Filed Nov. 29, 1961, Ser. No. 155,598
8 Claims. (Cl. 317—158)

This invention relates to continuous magnetic-flux pumps. The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to a method and means for altering the intensity of a magnetic field by transposing flux from one location to the location desired for said magnetic field and, more particularly, to improvements therein.

In an application by Alvin F. Hildebrandt and Daniel D. Elleman, which is assigned to a common assignee, there has been described and claimed a Magnetic-Flux Pump, Ser. No. 155,597, filed Nov. 29, 1961. The device described includes a pair of communicating cavities formed in a block of superconducting material. A piston, also made of superconducting material, is dimensioned to be insertable into one of the cavities and to substantially fill said cavity. Magnetic flux is first trapped in the cavities by establishing a magnetic field therein while the superconducting material is above the critical temperature at which it goes superconducting. Thereafter, the temperature of the material is reduced below the critical value, and then the exciting magnetic field may be removed. The piston is then inserted into the cavity, whereby the trapped flux is displaced therefrom and moved to the other cavity through the communicating region, in which other cavity it is added to the field already present. By varying the ratios of the areas of the two cavities, it is possible to produce a field having much greater flux density in the second, smaller cavity, into which the flux is transposed.

It is found that, in order to retain the flux in the second cavity, it was necessary to maintain the piston in the first cavity. As soon as the piston was removed from the first cavity, the additional flux in the second cavity would return to the first cavity. Thus, it was not possible to increase flux in the second cavity by adding thereto from the first cavity, since every time the piston was removed from the first cavity the additional flux in the second cavity would return to the first cavity.

An object of this invention is the provision of a magnetic-flux-pumping apparatus wherein magnetic flux can be transferred from one region to a second region, held in said second region while more magnetic flux is applied to said first region, and thereafter transferred to said second region to be added to the flux already there.

Another object of this invention is the provision of a magnetic-flux-pump apparatus which permits the continual increase of magnetic flux to a magnetic-flux field.

Yet another object of this invention is the provision of a novel and useful apparatus for establishing a larger magnetic field than heretofore thought attainable.

Still another object of the present invention is the provision of a system which enables incrementing a magnetic field to a desired intensity.

These and other objects of this invention may be achieved with apparatus which has first and second regions defined by walls made of material having the property of superconduction below a critical temperature. The first and second regions communicate with one another through a first magnetic-flux valve, which includes material having the property of super-conduction when below a critical temperature, and a means for raising this material above the critical temperature. Still another, or second, magnetic-flux valve is included, whereby a portion of one of the walls of said first region may have its temperature elevated above the critical value, whereby it is no longer superconducing. A piston is provided which substantially fills the first region when inserted therein and which is made of superconducting material.

Initially, all superconducting material is cooled below the critical temperature. A portion of the wall of said first region is heated above the superconducting temperature. An external magnetic-field-applying means is energized to aply a magnetic field to the first region. Thereafter, the first magnetic-flux valve is closed, whereby the entire wall defining said first region is enabled to become superconducting, whereby some flux is trapped in said first region. The magnetic-field-applying means may then be de-activated, if desired. The first flux valve is then opened, whereby the bridging material between the two regions is brought up to a temperature above the critical temperature.

The piston of superconducting material is then inserted into the first region to substantially fill it. As a result, the flux in the first region is displaced into the second region. At this time the first flux valve is closed, whereby the section of superconducting material which is between the two regions is again permitted to be cooled to a temperature below the critical temperature. The flux in the second region is then trapped and cannot get out, even when the piston is removed from the first region. The foregoing operation can be repeated, whereby the flux in the second region is continually incremented and the field intensity there is increased.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

It is known that when certain metals are cooled below a very low characteristic temperature they exhibit properties, such as an abnormally high electrical conductivity and an almost perfect diamagnetism (the Meissner effect). In accordance with this invention, advantage is taken of the superconductive effect for the purpose of either creating a large flux field or for creating a region which is substantially flux free. In other words, in accordance with this invention, the mechanism is provided for pumping magnetic flux from one region to a second region and kept there, employing apparatus which may be analogized to a valve which is operated to prevent flux from returning to the second region.

Figure 1:
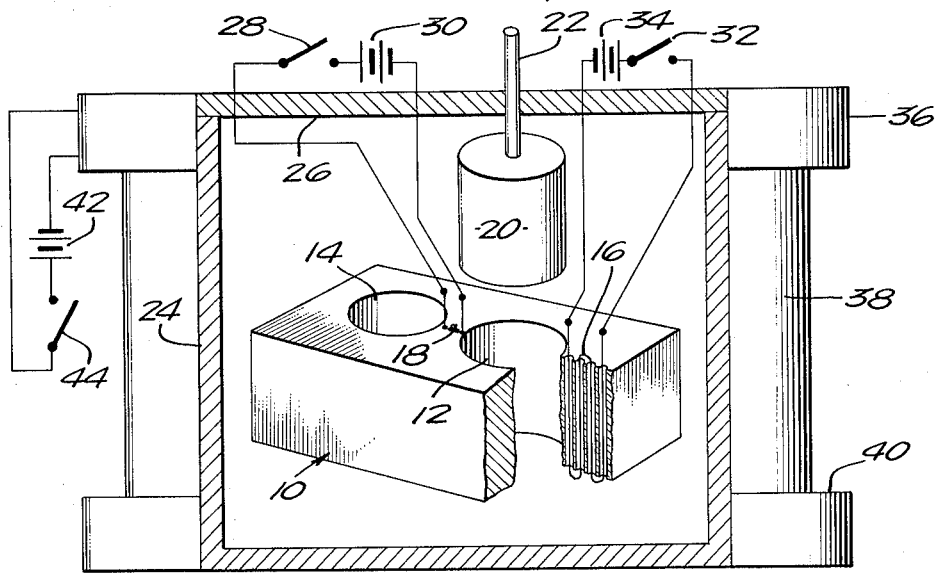
FIGURE 1 is a drawing of an embodiment of the invention.

Referring now to the drawing, FIGURE 1 shows an isometric and schematic view of an embodiment of the invention. Basically, this includes a block of material 10, which has the property of superconductivity when it is reduced in temperature to a value below a critical temperature value. Such materials are known and, for example, may be niobium or lead. The block of material has two cavities 12, 14 milled therethrough. These cavities are preferably cylindrical in form. Between the cavity 12 and the outside edge of the block of material, a number of holes are drilled, and through them is inserted heater wire 16. An number of holes are also drilled in the bridging material between the two cylindrical cavities 12, 14, and a heater wire 18 is also threaded through these cavities. The piston 20 is also made of material having the property of superconductivity and is dimensioned so that it may be inserted into the cavity 12, and, when in that cavity, it substantially completely fills it.

The piston is attached to a rod 22. Since the structure thus far described will have to be cooled below the critical temperature, it is placed in a cryostat, or Dewar flask. These are commercially purchasable apparatuses which are well known and are employed for the purpose of reducing the temperature of objects to a very low value. The walls of the Dewar flask are represented by the walls 24, shown in section. A cover 26 is provided for the Dewar flask. This cover has openings therein for the purpose of enabling the rod 22, which affords actuation of the piston 22 to extend outside the cover. Also, openings are provided so that connection may be made from the resistance wires 18, externally of the Dewar flask, to a switch 28 and to a source of potential 30. Similarly, the cover affords access to the resistance wires 16, so that connection may be made to an external switch 32 and a source of potential 34. As will be seen, the resistance wires represent means for heating the cavity-wall portion and the bridge portion in which they are inserted.

A means is provided for establishing a magnetic field within the cavities 12, 14, such that the lines of magnetic flux are parallel to the axis of the cavity. This means comprises three solenoid coils, respectively 36, 38, and 40, which surround the Dewar flask. Energy for these three coils is obtained from a source 42, which is connected to the three coils through a switch 44.

In operation, initially the piston 20 is not inserted in the cavity, and the piston 20 and the block 10 are brought down to a temperature below the critical value at which they exhibit the properties of superconductivity. At this time, the switch 32 is closed, whereby the resistance wires 16 heat the wall of the cavity 12, so that effectively the wall of the cavity 12 does not constitute a closed cylinder of superconducting material, but there is an opening therein. Alternatively stated, there is no closed path for current of the type induced in the superconducting wall to flow. The circuit of material in a superconductive state is opened. As a result, when the switch 44 is closed, the solenoid coils 36, 38, and 40 are enabled to extend the magnetic field through the cavity 12. This could not be done if the walls of the cavity 12 did constitute a closed cylinder of superconducting material at the superconductive temperature.

Thereafter, the switch 32 is opened, whereupon the region of the wall of the cavity 12, which is held above the superconducting temperature, is permitted to be cooled below the superconducting temperature. As a result, flux is trapped within the cavity 12, so that when the switch 44 is opened and the external magnetic field is removed, a magnetic field remains which extends through the cavity 12, existing by virtue of persistent currents flowing in the walls of the cavity. Next, the switch 28 is closed, whereupon, the superconducting bridging region, which is between the cavities 12 and 14, is heated up above the superconducting temperature. This has no effect on the total trapped field, even though a region is established along the walls of the cavities 12 and 14 which is above the superconducting temperature, except that the field redistributes itself, some of the flux transferring across the bridging material to the cavity 14. However, when the piston 20 is inserted into the cavity 12 the trapped flux can be and is moved through the region between the cavities 12, 14, which now is not superconducting, to the region of the cavity 14. This occurs by virtue of the fact that the piston 20 is perfectly conducting, and, when inserted into the cavity 12, surface-eddy currents are induced on the piston which maintain the field internal to the piston at zero, and so increase the field external to the piston to a value which results from compressing all the lines of magnetic flux formerly occupying the cylinder into the space now left between the piston and the cylinder wall of cavity 12, the space between cavity 12 and 14, and the interior in cavity 14.

Now, if the switch 28 is opened, the bridging region between the cavities 12, 14 is cooled below the superconducting temperature. As a result, even though the piston 20 is removed from the cavity 12, the flux in the cavity 14 remains trapped and cannot return to the cavity 12.

By repeating the foregoing operations, namely, (1) closing switch 32, (2) closing switch 44, (3) opening switch 32, (4) opening switch 44, (5) closing switch 28, (6) inserting piston 20 into the cavity 12, (7) opening switch 28, and (8) removing piston 20 from cavity 12, additional increments of flux may be added to the cavity 14 to build up the flux field to an extremely high intensity. Provision may be made for inserting any desired instruments or apparatus in the cavity 14 from outside the cryostat by the expedient of extending a tube with insulating walls from outside of the cryostat through the cryostat cover into the cavity 14, or by forming the cryostat so that cavity 14 is available.

The apparatus just described may also be used for creating a region which is substantially free of magnetic flux. In order to do this, the block of material 10 is oriented so that the magnetic-flux lines of the earth's magnetic field extend parallel to the axis of the cylindrical cavities 12, 14. The piston 20 and the block 10 are all cooled below the temperature of superconductivity, as before. Thereafter, the apparatus is operated as previously described, except that no external field coils 36, 38, and 40 are needed. The external field is provided by the earth's field. Therefore, first switch 32 is closed, whereby the region between the cavity 12 and the outer wall of the block of material 10 is heated above the superconducting temperature. The earth's magnetic field can then establish a field within the cavity 12. Switch 32 is then opened, whereby the region of the wall of the cylindrical cavity 12, which was above the superconducting temperature, is cooled below that temperature. Then switch 28 is closed to heat the adjacent wall regions of cavities 12 and 14 above the superconducting temperature.

A piston 20 is next inserted into the cavity 12, whereby the flux in the cavity 12 is pumped across to cavity 14. Then switch 28 is opened. After the region between the cavities 12 and 14 has cooled below the critical temperature, piston 20 is withdrawn from cavity 12. Cavity 12 then has completely superconducting walls, and, as a result, the earth's field cannot enter the cavity 12; neither can the flux in cavity 14 leak across the bridging material. Therefore, the region established by the cylindrical walls of the cavity 12 is substantially magnetic-field free. Any desired experiments may then be conducted within this region, to which access may be had by inserting through a suitable opening in the cover 26 a cylindrical tube with insulating walls.

Figure 2:
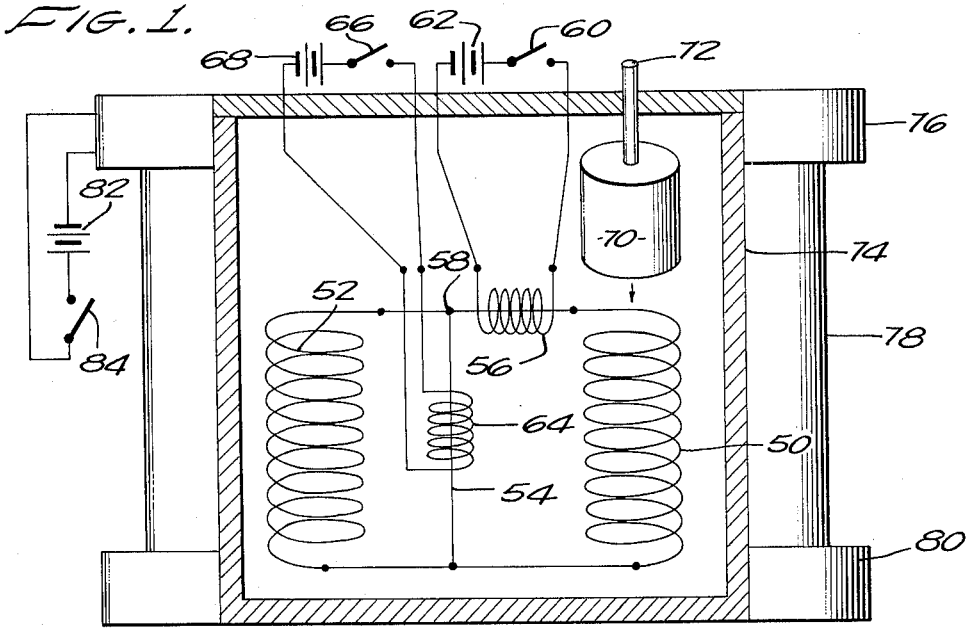
FIGURE 2 is a schematic drawing of another embodiment of the invention.

FIGURE 2 is a circuit diagram of apparatus for effectively accomplishing the results achieved by the apparatus of FIGURE 1, which employs wire made of superconducting material, rather than the superconducting block 10. The apparatus includes a first solenoid 50, made of superconducting material such as niobium wire. A second solenoid 52 is also made of superconducting material and is connected in parallel with the first solenoid 50. A shorting connection 54 is made between the ends of the first and second solenoids. A coil of resistance wire 56 is wound around an end of the first solenoid 50, which connects to a junction 58 of the shorting wire 54. This heater wire 56 is connected to apparatus placed externally of the cryostat, which includes a switch 60 and a source of operating potential 62.

Another coil of heater wire 64 is wound around the shorting connection 54 and is connected externally of the cryostat to a switch 66 in series with a source of potential 68. The piston 70 of superconducting material is sufficiently large to be insertable into the cylinder defined by the coils of the first solenoid 50, to substantially fill that cylinder. The piston 70 is connected to a handle 72, to enable the piston 70 to be moved into the cylindrical cavity defined by the solenoid 50 from outside of the cryostat 74. A means for providing a magnetic field with flux lines parallel to the axes of the first and second solenoids, respectively 50, 52, includes a first coil 76, a second coil 78, and a third coil 80, which surround the cryostat 74. Energy for the three field-establishing solenoids consists of a source of potential 82 connected in series with a switch 84 which is connected to the three coils.

Initially, the first and second solenoids, respectively 50, 52, the shorting connection 54, and the piston 70 are all cooled below the critical temperature. Then the switch 60 is closed, whereby the resistance wire 56 heats up one end of the solenoid 50. Then switch 84 is closed, to provide a magnetic field. Since one end of the solenoid 50 is above the critical temperature, the closed circuit of material in its superconducting state is opened, no current flows, and a magnetic-flux field can be established through the solenoid winding. Otherwise, if one end of the solenoid 50 were not above the critical temperature, currents would be induced which would flow through the solenoid and the shorting wire, and these currents would establish a flux field which would oppose that of the field sought to be established.

The switch 60 is next opened, whereby the connection between the end of the solenoid winding 50 and the junction 58 is cooled below the critical temperature. The switch 84 is then also opened, whereby the flux field from outside of the cryostat is removed. However, a field still exists by reason of the flux which is trapped by the superconducting solenoid 50. The current maintaining this trapped field flows in a path which includes winding of the solenoid 50 and the short-circuiting connection 54.

The switch 66 is closed, whereby the resistance winding 64 heats the wire 54 above the superconducting temperature. As a result, the current which maintains the trapped field will flow through the solenoid winding 52, which is below the critical temperature, rather than through the shorting wire 54, which is above the critical temperature, because the resistance of the wire 54, when above the critical temperature, effectively is that of an insulator, when compared with the resistance of the winding 52, which is below the critical temperature.

At this time, the piston 70 is inserted into the cylindrical cavity defined by the turns of the first solenoid 50. As a result, all magnetic flux within the cavity of this solenoid is transferred over the second solenoid 52. The switch 66 is opened, and the shortening wire 54 is permitted to cool to a temperature below the critical temperature. Accordingly, the current which circulates maintains the field previously trapped by the solenoid 50 in solenoid 52. The piston 70 can be withdrawn from the solenoid 50. The switch 60 can then be closed, and a new pumping cycle can be initiated.

The apparatus described operates to build up the intensity of the mangetic field, which extends through the solenoid 52 by effectively using a mechanical pumping motion to transfer the flux into the receiving region.

Just as the apparatus described in FIGURE 1 could be employed for establishing a field-free region, so the apparatus of FIGURE 2 may be employed for this purpose. The utilization of the piston and the flux gates, as the heating wires or resistance windings may be called, is similar in both instances. For this purpose, the orientation of the solenoids 50 and 52 is such that their axis is parallel with the magnetic-field lines of the earth's field. If desired, the cavity defined by the second solenoid 52 and also the cylindrical cavity 14 in FIGURE 1 may be evacuated of magnetic flux. This can be done by initially orienting the structures, as indicated, to be parallel to the magnetic lines of flux of the earth's field. The structures are at a temperature above the critical temperature. The structures are then cooled below the critical temperature, thus trapping the magnetic field within the indicated cavities. Now in FIGURE 1, the switch 32 is closed, thus opening the superconducting circuit around the wall of the cavity 12 by heating it above the critical temperature. The piston 20 is then inserted in the cavity, displacing the flux therefrom. Because the communicating material between cavities 12 and 14 is below the critical temperature, the flux is not displaced into the cavity 14. The switch 32 is then opened, and the material at the outer wall of the cavity 12 is then permitted to be cooled below the critical temperature. Then piston 20 is withdrawn from the cavity 12, whereby a substantially field-free region exists therein.

At this time, switch 28 is closed, which heats the bridging material between apertures 12 and 14 above the critical temperature. This enables magnetic flux which is in the cavity 14 to flow to the pump chamber 12 through the bridging material, which is above the superconducting temperature. As a result, the intensity of the magnetic field in the region 14 is lowered.

Thereafter, switch 28 is opened, whereby the flux which flowed into the cavity 12 is trapped therein. The cycle of operation described above is then repeated, in order to drive the trapped flux out of the cavity 12. In review, this operation comprises, first, closing switch 32; next, the piston 20 is inserted in the cavity 12; next, switch 32 is opened; thereafter, piston 20 is withdrawn from the cavity 12; then switch 28 is closed; and, thereafter, switch 28 is opened. In this manner, the region defined in cavity 14 may be pumped down to be substantially magnetic-field free.

Substantially the same technique may be employed for establishing a field-free region within the cavity defined by the turns of the solenoid winding 52. Initially, the apparatus is arranged so that the magnetic lines of flux of the earth's field pass through the solenoid windings parallel to the axis thereof. The solenoids are then cooled below the critical temperature. Next, switch 60 is closed, which effectively enables the magnetic field which exists within the turns of the solenoid winding 50 to be displaced therefrom by the insertion of the superconducting piston 70.

Next, the switch 60 is opened, and the switch 66 is closed. Thereafter, the piston 70 is withdrawn from the cavity of the solenoid 50. This permits the magnetic flux which is trapped in the solenoid 52 to transfer into the solenoid 50. The reason that this occurs is because, when switch 60 is opened, the connection of the end of the solenoid 50 to the junction 58 goes below the superconducting temperature. When the switch 66 is closed, the shorting connection 54 is permitted to be heated up beyond the superconducting temperature. As a result, current, due to the trapped field in the solenoid 52, is permitted to circulate through the winding 50. Then, switch 66 is opened, whereupon the connection 54 goes below the superconducting temperature, and current which flows through the winding 50 can also flow through the connection 54, instead of through the solenoid 52.

The cycle of operation just described is then repeated. In this manner, the magnetic field existing in the cavity established by the turns of the solenoid winding 52 is reduced to substantially zero.

In an application for a Magnetic-Flux Pump, by Alvin F. Hildebrandt, Daniel D. Elleman, and Frank C. Whitmore, Serial No. 155,596, filed November 29, 1961, which is assigned to a common assignee, there is described an arrangement for increasing considerably the efficiency of magnetic-flux pumps by extending the cylinder 20 in an axial direction with material such as iron, or ferrous material, which is first inserted in the cavity when the magnetic field is first established therein. Thus, a larger amount of flux than that which is possible with only air existing in the cavity is initially concentrated in the cavity and can thereafter be trapped. In this manner, more flux can be pumped. The use of an additional section of piston with iron may be employed herein for increasing the efficiency of the operation of the magnetic-flux pump shown in FIGURES 1 and 2.

There has accordingly been described and shown herein novel and useful apparatus for effectively pumping magnetic flux employing mechanical means, whereby the flux can be concentrated in a predetermined region to substantially a desired magnetic-flux intensity. It will be appreciated that by altering the cross-sectional areas of the pumping cavity 12 to the storage cavity 14, or the respective cavities established by the first and second solenoids, the intensity of the magnetic fields established may also be varied in a desired manner. There is provided by this invention a unique energy-storage device, since the cavity in which the magnetic flux is stored affords instant access to the magnetic field without the presence of the inductance normally presented by the solenoid usually employed for establishing high-intensity mangetic fields.

We claim:

1. A magnetic-flux pump comprising first superconductive means for establishing a first magnetic-flux trapping region, second superconductive means for establishing a second magnetic-flux trapping region, first means for enabling when operative the introduction of magnetic flux into said first magnetic-flux trapping region, means for controlling the operability of said first means, means for applying magnetic flux to said first magnetic-flux trapping region when said first means is operative, second means for enabling when operative the transfer of magnetic flux from said first to said second magnetic-flux trapping region, means for controlling the operability of said second means, and means for driving magnetic flux from said first to said second flux-trapping region when said second means is operative.

2. A magnetic-flux pump as recited in claim 1 wherein said first superconductive means for establishing a first flux-trapping region and said second superconductive means for establishing a second flux-trapping region each respectively comprises walls defining a cavity, said cavity walls having a region of contiguity, said walls being made of material having the property of superconductivity when below a predetermined temperature; said first means comprises means for raising the temperature above said predetermined temperature of a portion of the walls defining the cavity comprising said first flux-trapping region, and said second means comprises means for raising the temperature of the contiguous portion of the walls defining the cavities comprising said first and second flux-trapping region above said predetermined temperature.

3. A magnetic-flux pump as recited in claim 1 wherein said first superconductive means for establishing a first flux-trapping region and said second superconductive means for establishing a second flux-trapping region comprise two solenoid coils, means connecting both said solenoid coils in parallel with each other, and a shorting wire connected across said parallel-connected solenoid coils, said solenoid coils and said shorting wire being made of material having the property of superconductivity when cooled below a predetermined temperature; said first means comprises means for raising the temperature of one end of said solenoid coils above said predetermined temperature, said second means comprises means for raising the temperature of a portion of said shorting wire above said predetermined temperature.

4. A magnetic-flux pump comprising first superconductive means for establishing a first magnetic-flux trapping region, second superconductive means for establishing a second magnetic-flux trapping region, superconductive means common to both flux-trapping regions, first means for enabling when operative the introduction of magnetic flux into said first magnetic-flux trapping region, means for controlling the operability of said first means, second means for enabling when operative the transfer of magnetic flux from said first to said second magnetic-flux trapping region, means for controlling the operability of said second means, and means for transferring flux from said first to said second flux-trapping region when said second means is operative.

5. A magnetic-flux pump as recited in claim 4 wherein said first and second superconductive means comprises a block of material having a first and second cylindrical cavity therein, said superconductive means common to both flux-trapping regions includes the material of said block which is between said cavities, said block being made of material having the properties of superconductivity below a predetermined temperature, said first means comprises means for raising the temperature of a portion of the wall of said first cavity above said predetermined temperature, and said second means comprises means for raising the temperature of said material between said cavities above said predetermined temperature.

6. A magnetic-flux pump as recited in claim 4 wherein said first and second superconductive means respectively comprise first and second solenoid coils, means connecting both said solenoid coils in parallel with each other, said superconductive means common to both flux-trapping regions includes a shorting wire connected across both said connected-together solenoid coils, said solenoid coils and said shorting wire being made of material having the property of superconductivity when cooled below a predetermined temperature; said first means comprises means for raising the temperature of one end of said solenoid coils above said predetermined temperature, said second means comprises means for raising the temperature of a portion of said shorting wire above said predetermined temperature.

7. A magnetic-flux pump comprising a block of material having a first and second cylindrical cavity formed therein, said cavities being spaced from one another by a bridge of material, a piston for insertion into said first cavity, said piston being dimensioned to substantially fill said cavity when inserted therein, said block and said piston being made of material which has the property of superconductivity when cooled below a predetermined temperature, means for cooling said block and piston below said predetermined temperature, first means for heating a portion of said block of material forming the wall of said first cavity above said critical temperature, means for establishing a magnetic field extending through said first cavity, means for inactivating said first means for heating to permit said first cavity wall to be cooled below said critical temperature, second means for heating said bridge of material above said critical temperature, means for inserting said piston into said first cavity to transfer the magnetic flux therefrom into said second cavity, means for inactivating said second means for heating to enable said bridge of material to be cooled below said critical temperature, and means for withdrawing said piston from said first cavity.

8. A magnetic-flux pump comprising a first solenoid coil having first and second ends and defining a first cavity within the turns thereof, a second solenoid coil having first and second ends connected to the respective first and second ends of said first solenoid coil, said second solenoid coil defining a second cavity within the turns thereof, a shorting wire connected between the connected-together ends of said solenoid coils to be connected across both solenoids, a piston, said first and second solenoid coils, said shorting wire, and said piston being made of material having the property of superconductivity below a predetermined temperature, means for cooling said solenoid first and second coils, said piston, and said shorting wire below said predetermined temperature, first means for raising the temperature of one end of said first solenoid coil above said critical temperature, means operable for establishing a magnetic field with flux lines extending through said first cavity, means for rendering said first means inoperative to permit said one end of said first solenoid coil to be cooled below said critical temperature, means for rendering said means for establishing a magnetic field inoperative, second means for raising the temperature of said shorting wire above said critical value, means for inserting said piston into said first cavity, means for rendering said second means inoperative to permit said shorting wire to be cooled below said critical temperature, and means for removing said piston from said first cavity.

References Cited by the Examiner

UNITED STATES PATENTS 2,946,030  7/1960  Slade _____ 336—155

BERNARD A. GILHEANY, *Primary Examiner.*

E. JAMES SAX, JOHN F. BURNS, *Examiners.*